United States Patent
Mohzani et al.

(10) Patent No.: US 12,187,144 B2
(45) Date of Patent: Jan. 7, 2025

(54) CONNECTION DEVICE FOR A DEVICE FOR CHARGING AN ELECTRICAL ENERGY ACCUMULATOR, CHARGING DEVICE AND ELECTRIC VEHICLE

(71) Applicant: Robert Bosch GmbH, Stuttgart (DE)

(72) Inventors: Zaki Bin Mohzani, Stuttgart (DE); Konstantin Decu, Pforzheim (DE)

(73) Assignee: Robert Bosch GmbH, Stuttgart (DE)

( * ) Notice: Subject to any disclaimer, the term of this patent is extended or adjusted under 35 U.S.C. 154(b) by 11 days.

(21) Appl. No.: 18/030,310

(22) PCT Filed: Sep. 9, 2021

(86) PCT No.: PCT/EP2021/074811
§ 371 (c)(1),
(2) Date: Apr. 5, 2023

(87) PCT Pub. No.: WO2022/078677
PCT Pub. Date: Apr. 21, 2022

(65) Prior Publication Data
US 2023/0365009 A1    Nov. 16, 2023

(30) Foreign Application Priority Data
Oct. 15, 2020   (DE) ..................... 10 2020 213 002.7

(51) Int. Cl.
*B60L 53/16*   (2019.01)
*B60L 53/62*   (2019.01)
*H02J 7/00*    (2006.01)

(52) U.S. Cl.
CPC ............... *B60L 53/16* (2019.02); *B60L 53/62* (2019.02); *H02J 7/0047* (2013.01); *H02J 7/00712* (2020.01)

(58) Field of Classification Search
CPC ........ B60L 53/16; B60L 53/62; H02J 7/0047; H02J 7/00712
See application file for complete search history.

(56) References Cited

U.S. PATENT DOCUMENTS

| | | |
|---|---|---|
| 2013/0083945 A1 | 4/2013 | Rossum |
| 2015/0180344 A1 | 6/2015 | Lunghard et al. |

(Continued)

FOREIGN PATENT DOCUMENTS

| | | |
|---|---|---|
| CN | 107921880 A | 4/2018 |
| CN | 109565173 A | 4/2019 |

(Continued)

OTHER PUBLICATIONS

Translation of International Search Report for Application No. PCT/EP2021/074811 dated Jan. 20, 2022 (2 pages).

*Primary Examiner* — Jeffrey M Shin
(74) *Attorney, Agent, or Firm* — Michael Best & Friedrich LLP

(57) ABSTRACT

The present invention relates to the connection of a charging circuit for charging an electrical energy accumulator by means of a single-phase or multi-phase electrical alternating voltage. To this end, a filter means for suppressing interfering signals is provided at an input before a switchover between a single-phase or multi-phase charging process. In this way, the properties, in particular the capacitive properties, of the filter means are not influenced by the circuit configuration at the switchover between single-phase or multi-phase charging.

8 Claims, 4 Drawing Sheets

(56) References Cited

U.S. PATENT DOCUMENTS

| | | |
|---|---|---|
| 2016/0089988 A1 | 3/2016 | Bartz et al. |
| 2016/0221462 A1* | 8/2016 | Ripoll ..................... B60L 53/60 |
| 2019/0168628 A1* | 6/2019 | Pfeilschifter ........... B60L 53/18 |

FOREIGN PATENT DOCUMENTS

| | | |
|---|---|---|
| DE | 102010010722 A1 | 8/2011 |
| DE | 102016211387 A1 | 12/2017 |
| DE | 102018203388 A1 | 9/2019 |
| EP | 3132967 A1 | 2/2017 |
| EP | 3485555 A1 | 6/2020 |

* cited by examiner

CONNECTION DEVICE FOR A DEVICE FOR CHARGING AN ELECTRICAL ENERGY ACCUMULATOR, CHARGING DEVICE AND ELECTRIC VEHICLE

BACKGROUND OF THE INVENTION

The present invention relates to a connection device for a device for charging an electrical energy accumulator. The present invention further relates to a charging device for charging an electrical energy accumulator device as well as an electric vehicle having such a device.

Fully or at least semi-electrically driven vehicles draw their drive power from an electrical energy accumulator device, such as a traction battery. This traction battery can be recharged by means of electrical energy from a power system and then provides electrical energy to drive the vehicle. In particular in the case of longer service lives of the vehicle, the traction battery can be recharged, for example, by means of the electrical energy of a single or multi-phase AC voltage connection, as is usually available in almost every home installation.

For example, publication DE 10 2010 010 722 A1 discloses a charger for an electric vehicle. This publication describes a circuit for connecting a charging unit for an accumulator to a supply network, wherein the supply network comprises a plurality of connections. The charging unit comprises at least two stages, wherein each stage can be connected to all connections of the supply network.

SUMMARY OF THE INVENTION

The present invention discloses a connection device for a device for charging an electrical energy accumulator device, a charging device for charging an electrical energy accumulator device, and an electric vehicle having the features of the independent claims. Further advantageous embodiments are the subject matter of the dependent claims.

Accordingly, the following is provided:

A connection device for a device for charging an electrical energy accumulator device having an input connection, an output connection, a switching means, and a filter means. The input connection comprises a plurality of phase connections. The input connection is configured to be optionally connected to either a single-phase or multi-phase electrical power source. The output connection comprises a plurality of phase connections. The output connection is configured to be connected to a device for charging an electrical energy accumulator device. The switching means is configured to electrically connect one or more electrical phases of the input connection with corresponding phase connections of the output connection. The filter means is configured to filter out electrical interfering signals on the electrical connections between the input connection and the output connection. The filter means is arranged electrically between the input connection and the switching means. In particular, the switching means is arranged between the filter means and the output connection connector.

The following is furthermore provided:

A charging device for charging an electrical energy accumulator device having a connection device according to the invention and a device for charging the electrical energy accumulator device. The device for charging the electrical energy accumulator is configured to charge the electrical energy accumulator using a single-phase or multi-phase electrical alternating voltage provided at the input connection of the connection.

Finally, the following is provided:

An electric vehicle having an electric drive system, an electric energy accumulator device, and a charging device according to the present invention for charging the electric energy accumulator.

The present invention is based on the finding that electrical energy from a single or multi-phase power supply network can be used in order to charge an electrical energy accumulator device, in particular to charge a traction battery of an electric vehicle. The charging device is generally designed for the maximum usable number of electrical phases of the AC voltage grid. As a rule, the charging device is therefore configured for three-phase operation. However, if fewer phases, for example only one electrical phase, are available for charging the electrical energy accumulator, a corresponding switchover must take place in the charging device.

In addition, precautions must also be taken in a charging device for charging an electrical energy accumulator system by means of electrical energy from a power system in order to prevent or at least minimize the feeding of interferences, in particular high-frequency interfering signals, into the power system. Combinations of capacitive and inductive components are generally provided for this purpose. Such filter elements are typically located between the switching means for the selection of the electrical phases to be used on one side and the charging electronics on the other side in conventional charging devices. Depending on the selection of the electrical phases to be used for the charging process and the corresponding switch positions, different properties in the filter means for minimizing the electrical interfering signals are thus obtained.

It is therefore an idea of the present invention to take this realization into account and to provide a charging device for charging an electrical energy accumulator device, which allows for the same or at least approximately the same filter properties for suppressing interfering signals as independently as possible of the number of electrical phases to be used for the charging process.

According to the present invention, it is provided for this purpose to arrange the filter means for suppressing the electrical interfering signals during the charging process in an electrical path between an input connection and the switching means for the selection of the electrical phases to be used. In other words, the filter means is provided directly at the input connection port of the charging device. As a result, the input connection always has the same electrical properties of the filter means regardless of the switch positions of the switching elements in the switching means. In this way, the individual components of the filter means can be optimized for this always constant configuration. This results on the one hand in improved filter properties with respect to the suppression of interfering signals, and on the other hand, with this optimization, the dimensions of the components can also be minimized. This not only leads to reduced costs, but also to savings in terms of weight and construction volume.

According to one embodiment, the filter means comprises at least a first Y capacitor assembly. In this first Y capacitor assembly, a capacitor element is arranged between an electrical phase and a reference potential. In addition, so-called X capacitors, which are arranged between two phases, can also be provided. Because the filtering assembly with the Y capacitors is arranged directly at the input connection, the properties of this capacitor assembly remain independent of the switch positions of the switches in the downstream switching assembly.

According to one embodiment, the filter means comprises a serial circuit consisting of a first Y capacitor assembly, a first inductive filter element, and a second Y capacitor assembly. The second Y capacitor assembly can be constructed the same as or at least approximately the same as the first Y capacitor assembly. In this way, a symmetrical circuit structure results. Of course, further X capacitors can also be provided in addition to the second Y capacitor assembly.

According to one embodiment, the filter means comprises a serial circuit consisting of a first Y capacitor assembly, a first inductive filter element, a second Y capacitor assembly, a second inductive filter element, and a third Y capacitor assembly. In addition, filter arrangements with even more inductive elements and capacitor arrangements connected in series are generally also possible. By using a plurality of inductive and capacitive filter components connected in series, the filter properties can be further improved.

According to one embodiment, the connection device comprises a voltage detector. The voltage detector can be configured to detect an electrical voltage on the phase connections of the input connection. In this case, the switching means can be configured to electrically connect a respective phase connection of the input connection to a corresponding phase connection of the output connection when the electrical voltage at the respective phase connection of the input connection exceeds a predetermined target value. In this way, depending on the single-phase or multi-phase electrical voltage available at the input connection, for example, switching can occur automatically in the switching means.

The described configurations and further developments can be combined with one another as desired, where appropriate. Further configurations, developments, and implementations of the invention also include combinations of features of the invention described above or hereinafter not explicitly specified in the foregoing with respect to the exemplary embodiments. The skilled person in particular also add individual aspects as improvements or additions to the respective basic forms of the invention.

BRIEF DESCRIPTION OF THE DRAWINGS

Further features and advantages of the invention are explained hereinafter with reference to the drawings. Shown are.

DETAILED DESCRIPTION

Figure 1:
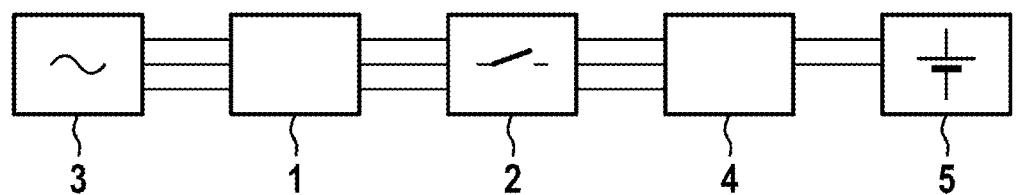
FIG. 1: a schematic view of a block diagram of a charging device according to an exemplary embodiment.

FIG. 1 shows a schematic view of a block diagram of a charging device for charging an electric energy accumulator 5 according to one embodiment. The charging device can be powered by a single-phase or multi-phase AC electric voltage source 3. For example, this can be a single or multi-phase connection to an electrical power system, for example a low-voltage system. The single-phase or multi-phase electrical power source 3 is initially connected to a filter means 1. For example, this filter means 1 can eliminate or at least reduce interfering signals, in particular high-frequency interfering signals. For example, such interfering signals can be caused by the charging circuit 4, which converts the single-phase or multi-phase AC voltage supplied by the AC electric voltage source 3 into a DC voltage to charge the electric energy accumulator 5.

The charging device further comprises a switching means 2, which can couple one or more electrical phases of the electric alternating voltage source 3 to the charging circuit 4. If, for example, only a single-phase AC voltage is supplied by the AC electric voltage source 3, the switching means 2 can only couple this one live phase to the charging circuit 4. In this case, a live phase L1, L2, or L3 can be provided on a plurality of phase connectors of a multi-phase charging circuit. If the charging circuit comprises a plurality of single-phase charging circuits (as explained below) the live phase can also be provided on a plurality of single-phase charging circuits in case of a single-phase power supply.

If an electric alternating voltage, for example a three-phase alternating voltage, is supplied from the electric alternating voltage source 3 to two or more phases, then the switching means 2 can couple all live phases to corresponding connections of the charging circuit 4.

While in conventional charging devices the filter means is typically provided electrically between the switching means 2 and the charging circuit 4, it is a special feature of this embodiment that the filter means 1 is provided between the electrical alternating voltage source 3 and the switching means 2.

Figure 2:
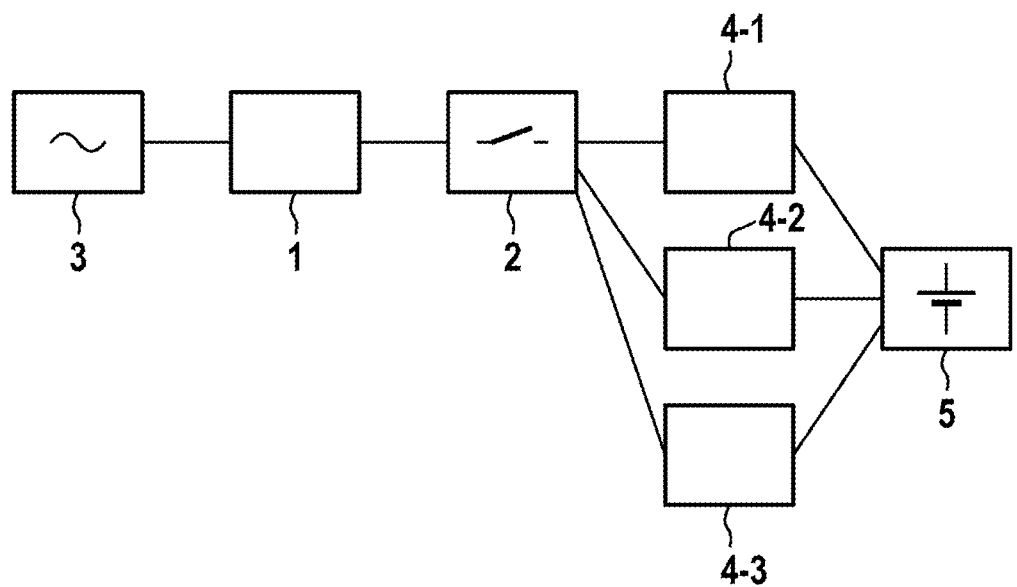
FIG. 2: a schematic view of a block diagram of a charging device according to a further exemplary embodiment.

FIG. 2 shows a schematic block diagram of a charging device according to a further embodiment. The charging device according to the embodiment of FIG. 2 largely corresponds to the previously described embodiment and differs in particular in that a separate charging circuit 4-i is provided for each electrical phase.

Figure 3:
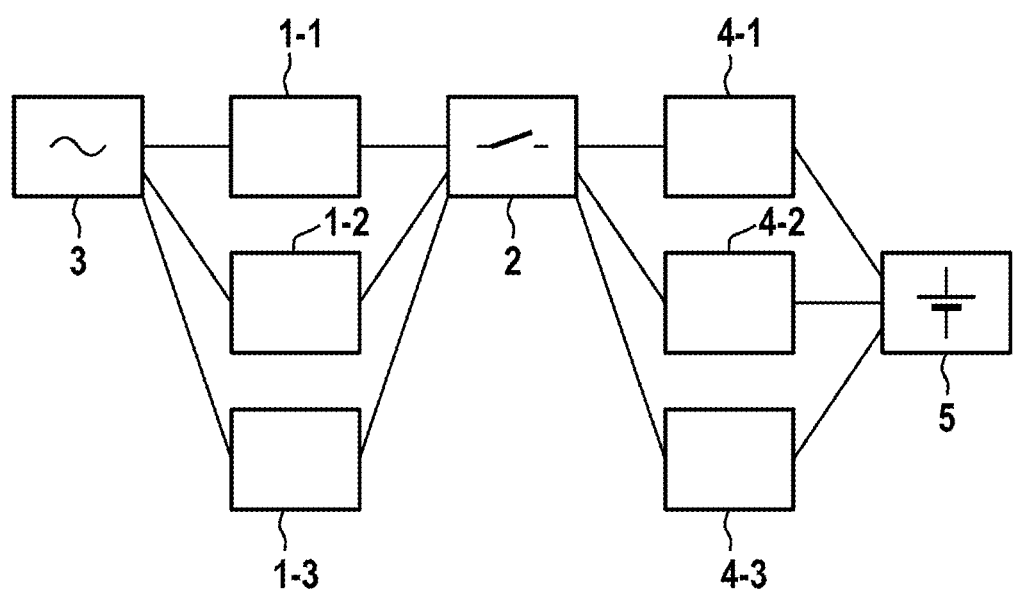
FIG. 3: a schematic view of a block diagram of a charging device according to a further exemplary embodiment.

FIG. 3 shows a schematic block diagram of a charging device according to a further embodiment. The charging device according to the embodiment of FIG. 3 largely corresponds to the previously described embodiments and differs in particular in that a separate filter means 2-i is provided for each electrical phase. In this case, in each of the individual filter means 2-i, each of the filter components can be provided for an electrical phase.

Figure 4:
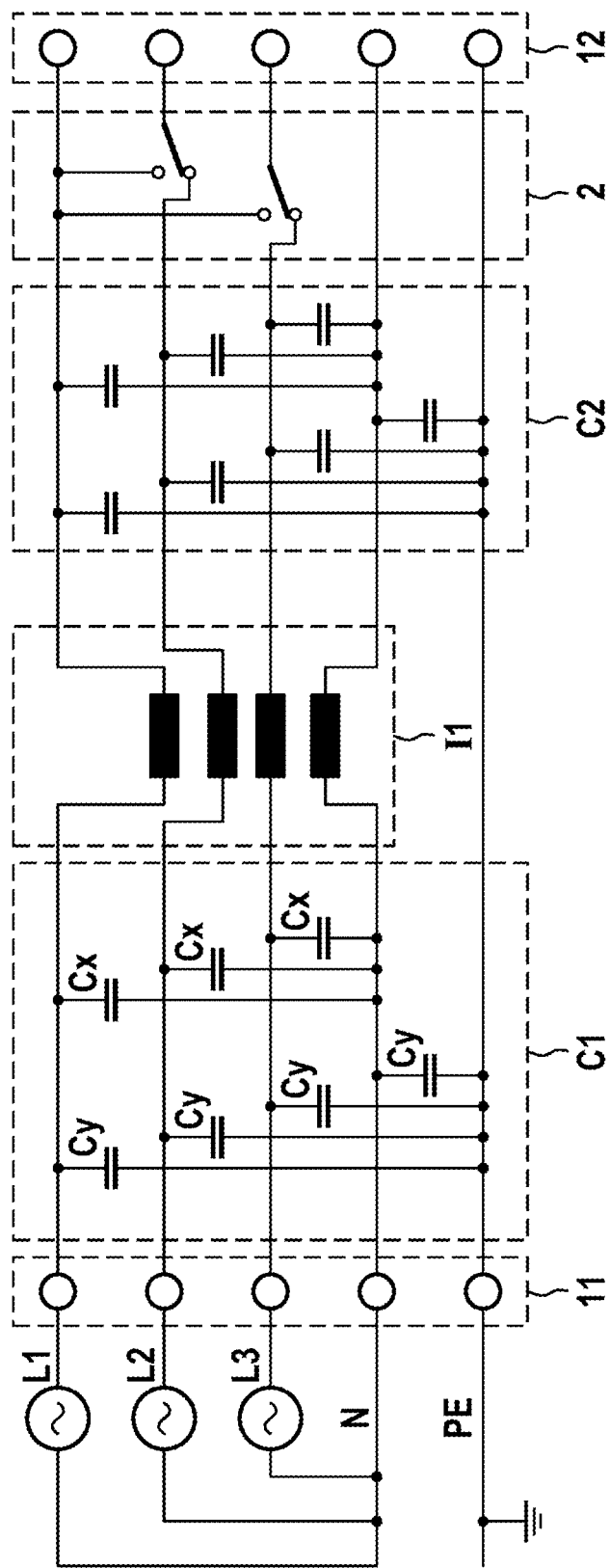
FIG. 4: a schematic view of a principle circuit diagram of a charging device with a connection device according to one embodiment.

FIG. 4 shows a schematic diagram of a schematic of a charging device for charging an electrical energy accumulator 5 according to one embodiment. The number of maximum three electrical phases L1, L2, and L3 shown herein is merely for the purpose of better understanding and does not constitute a limitation of the present invention here or in the other exemplary embodiments. The charging device can optionally include other components in addition to the components shown herein, such as breakers or overcurrent/surge protection elements. These are not shown in the schematic diagram shown in this case, for ease of understanding.

Similar to the embodiments described above, a single-phase or multi-phase AC electric voltage can be provided from an AC electric voltage source 3. This AC voltage can be supplied on an input connection 11. In addition to the live phases L1, L2, and L3, a neutral conductor N and a protective conductor PE can also be connected to the input connection 11. A filter means 1 is provided between the input connection 11 and the switching means 2 already described above. For example, this filter means 1 can eliminate or minimize interfering signals, in particular high frequency interfering signals, caused, for example, by the charging circuit 4.

In the embodiment shown in FIG. 4, the switching elements in switching means 2 can be used in order to couple the individual electrical phases L1, L2, and L3 to corresponding connections 12 for connecting the charging circuit, respectively. Alternatively, in the event that a charging voltage is only provided on one phase, for example L1, this single-phase charging voltage can be provided on all phase connections of the charging circuit by corresponding switch positions in the switching means 2. In the schematic diagram according to FIG. 4, for example, the voltage of the first phase L1 can also be additionally provided on the phase connections for L2 and L3 on the output connection 12.

Furthermore, the switching means 4 can also comprise further switching elements for providing an electrical input connection voltage on a further phase L2 or L3 on the output connection side on a plurality of phase connections. For example, a single-phase electric voltage on phase L3 can also be supplied to L1 and/or L2, or an electric voltage on L2 can additionally also be supplied to L1 and/or L3, The filter means 1 can comprise, for example, a serial circuit consisting of a first capacitor element C1, a first inductive component I1, and a second capacitor element C2. The first and/or second capacitor element C1, C2 can each comprise so-called Y capacitors and X capacitors. For example, the Y capacitors are each arranged between a phase L1, L2, L3 and a reference potential PE. For example, the X capacitors Cx can be provided between two electrical phases L1, L2, L3. The inductive component I1 can have an appropriate inductance in each phase, for example. If the neutral conductor N is also optionally provided in the charging device, an inductance can also be provided in this neutral conductor N, if applicable.

If the filter means 1 comprises a plurality of capacitor elements C1, C2, then all of these capacitor elements can be of the same or at least similar design.

Between the filter means 1 and an output connection 12, the switching means 2 is provided, which can couple the respective active phases with the charging circuit 4. For example, an electrical or mechanical switching element S1, S2, S3 can be provided for each electrical phase. Alternatively, it is also possible that at least one electrical phase L1 is permanently connected to the corresponding phase connection of the output connection 12, and only the further electrical phases L2, L3 have switching elements S2, S3.

A charging circuit 4 can be provided on the output connection 12, which, for example, converts the supplied single-phase or multi-phase AC electric voltage into a DC voltage that is suitable for recharging an electrical energy accumulator 5.

Figure 5:
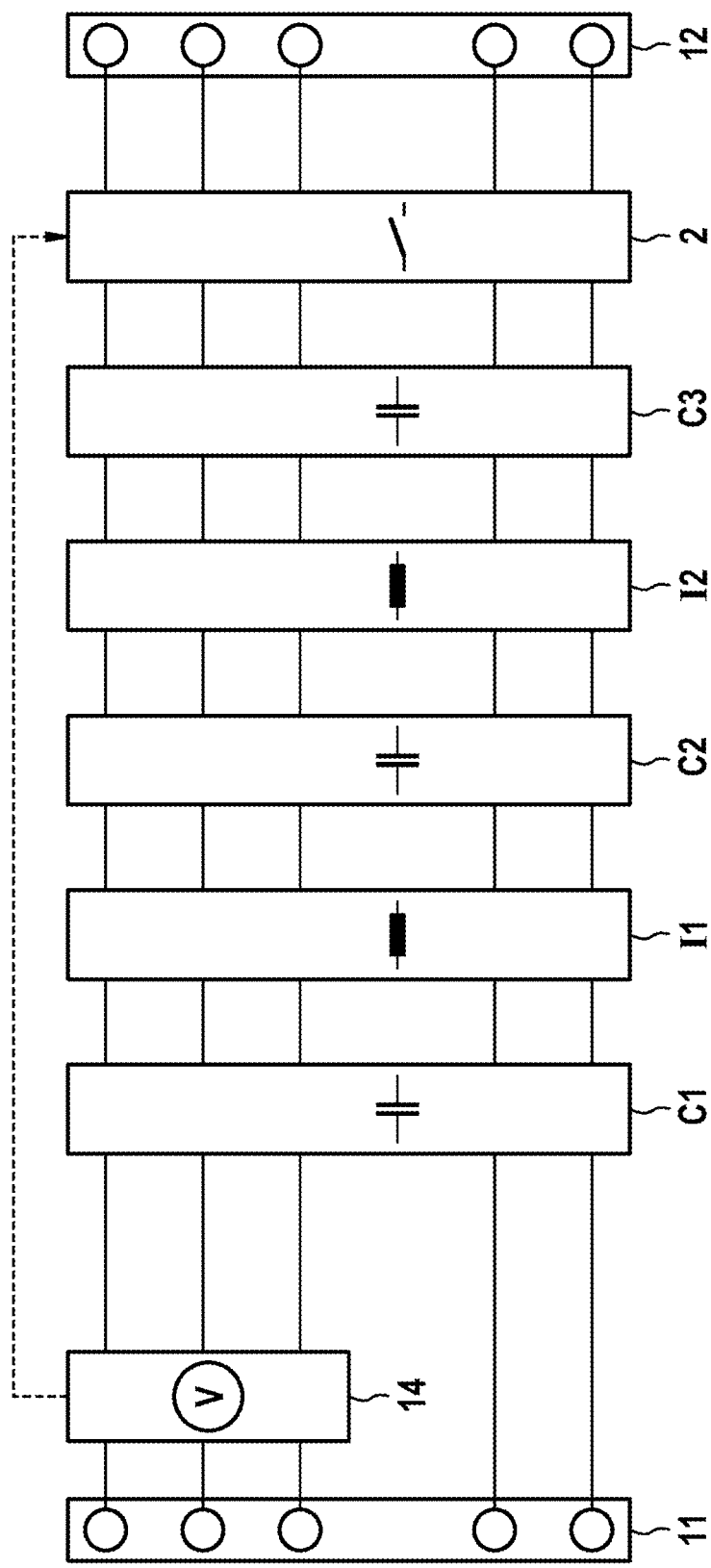
FIG. 5: a schematic diagram of a principle circuit diagram of a charging device according to a further embodiment.

FIG. 5 shows a schematic diagram of a schematic of a charging device for charging an electrical energy accumulator 5 according to a further embodiment. The embodiment shown in FIG. 4 largely corresponds to the embodiment described above and differs in particular from the embodiment described above in that, in the filter means 1, a serial circuit is provided consisting of a first capacitor element C1, a first inductive filter element I1, a second capacitor element C2, a second inductive filter element I2, and a third capacitor element C3. Each of the capacitive and inductive elements C1, C2, C3 and I1, I2 can correspond to the elements already described above. Therefore, in this diagram, a detailed representation of the individual capacitors in the capacitor elements C1, C2, C3 and the inductive elements I1, I2 is omitted.

In addition, a voltage detector 14 can optionally also be provided, for example. For example, this voltage detector 14 can monitor the electrical voltage on the phase connections of the input connection 11. If a significant electrical voltage, in particular an electrical voltage higher than a predetermined threshold value, is detected on one of the phase connections, then the switching means 2 can drive the corresponding switching element S1, S2, S3 in order to connect the corresponding electrical phase L1, L2, L3 to the respective phase connection of the output connection 12. In this way, the circuit configuration can be automatically adjusted according to the voltage ratios applied at the input connection 11.

The aforementioned charging device for charging an electrical energy accumulator 5 can in particular be used in order to charge a traction battery for a fully or at least semi-electrically driven vehicle.

In summary, the present invention relates to the connection of a charging circuit for charging an electrical energy accumulator device by means of a single-phase or multi-phase electrical alternating voltage. For this purpose, a filter means for suppressing interfering signals is provided at an input connection prior to a switchover between a single-phase and a multi-phase charging operation. In this way, the properties, in particular the capacitive properties of the filter means, are not affected by the circuit configuration in the switchover between single-phase and multi-phase charging.

The invention claimed is:

1. A connection device for a device for charging an electrical energy accumulator (5), comprising:
   an input connection (11) having a plurality of phase connections, wherein the input connection (11) is configured to be selectively connected to either a single-phase or a multi-phase electrical power source (3);
   an output connection (12) having a plurality of phase connections, wherein the output connection (12) is configured to be connected to a device (4) for charging an electrical energy accumulator (5);
   a switching means (2) configured to selectively electrically connect one or more electrical phases (L1, L2, L3) of the input connection (11) to corresponding phase connections of the output connection (12), wherein the switching means (2) includes switching elements configured to couple the one or more electrical phases (L1, L2, L3) of the input connection (11) to corresponding phase connections of the output connection (12) for connecting the device (4) for charging the electrical energy accumulator (5); and
   a filter means (1) configured to filter out electrical interfering signals on the electrical connections between the input connection (11) and the output connection (12), wherein the filter means (1) is arranged electrically between the input connection (11) and the switching means (2).

2. The connection device according to claim 1, wherein the filter means (1) comprises at least a first Y capacitor assembly, wherein in the first Y capacitor assembly a respective capacitor element (Cy) is arranged between an electrical phase (L1, L2, L3) and a reference potential (PE).

3. The connection device according to claim 1, wherein the filter means (1) comprises a serial circuit consisting of a first Y capacitor assembly, a first inductive filter element (I1), and a second Y capacitor assembly.

4. The connection device according to claim 1, wherein the filter means (1) comprises a serial circuit consisting of a first Y capacitor assembly, a first inductive filter element (11), a second Y capacitor assembly, a second inductive filter element (12), and a third Y capacitor assembly.

5. The connection device according to claim 1, having a voltage detector (14) configured to detect an electrical voltage on the phase connections of the input connection (11),
wherein the switching means (2) is configured to electrically connect a respective phase connection of the input connection (11) to a corresponding phase connection of the output connection (12) when the electrical voltage at the respective phase connection of the input connection (11) exceeds a predetermined threshold value.

6. A charging device for charging an electrical energy accumulator (5), comprising:
a connection device having
an input connection (11) having a plurality of phase connections, wherein the input connection (11) is configured to be selectively connected to either a single-phase or a multi-phase electrical power source (3);
an output connection (12) having a plurality of phase connections, wherein the output connection (12) is configured to be connected to a device (4) for charging an electrical energy accumulator (5);
a switching means (2) configured to selectively electrically connect one or more electrical phases (L1, L2, L3) of the input connection (11) to corresponding phase connections of the output connection (12), wherein the switching means (2) includes switching elements configured to couple the one or more electrical phases (L1, L2, L3) of the input connection (11) to corresponding phase connections of the output connection (12) for connecting the device (4) for charging the electrical energy accumulator (5); and
a filter means (1) configured to filter out electrical interfering signals on the electrical connections between the input connection (11) and the output connection (12),
wherein the filter means (1) is arranged electrically between the input connection (11) and the switching means (2); and
the device (4) for charging the electrical energy accumulator (5) configured to charge the electrical energy accumulator (5) using a single-phase or multi-phase electrical alternating voltage provided at the input connection (11) of the connection device.

7. An electric vehicle having:
an electric drive system;
an electrical energy accumulator (5); and
a charging device for charging the electrical energy accumulator (5) according to claim 6.

8. The connection device according to claim 1 wherein, when a charging voltage is provided on only one phase of the one or more electrical phases (L1, L2, L3) of the input connection (11), the switching means (2) is configured to couple, by means of corresponding switch positions in the switching means (2), the charging voltage to the phase connections of the output connection (12).

* * * * *